US007480556B2

United States Patent
Jauss et al.

(10) Patent No.: US 7,480,556 B2
(45) Date of Patent: Jan. 20, 2009

(54) INTERNAL COMBUSTION ENGINE FOR OPERATION WITH TWO DIFFERENT KNOCK RESISTANT FUELS

(75) Inventors: Andreas Jauss, Westernohe (DE); Mathias Braune, Schweinfurt (DE)

(73) Assignees: GM Global Technology Operations, Inc., Detroit, MI (US); BRA GmbH, Schweinfurt (DE)

( * ) Notice: Subject to any disclaimer, the term of this patent is extended or adjusted under 35 U.S.C. 154(b) by 386 days.

(21) Appl. No.: 10/597,260

(22) PCT Filed: Apr. 23, 2004

(86) PCT No.: PCT/DE2004/000844

§ 371 (c)(1),
(2), (4) Date: Jul. 18, 2006

(87) PCT Pub. No.: WO2004/097198

PCT Pub. Date: Nov. 11, 2004

(65) Prior Publication Data

US 2008/0228380 A1 Sep. 18, 2008

(30) Foreign Application Priority Data

Apr. 26, 2003 (DE) ............................... 103 18 963

(51) Int. Cl.
*F02D 45/00* (2006.01)

(52) U.S. Cl. ...................... 701/104; 701/111

(58) Field of Classification Search ......... 701/103–105, 701/111, 114, 29, 35; 123/299, 305
See application file for complete search history.

(56) References Cited

U.S. PATENT DOCUMENTS

| 6,532,406 B1 * | 3/2003 | Schmedding et al. ......... 701/29 |
| 6,951,202 B2 * | 10/2005 | Oda ........................... 123/299 |
| 2002/0157619 A1 | 10/2002 | Gray | |

FOREIGN PATENT DOCUMENTS

| DE | 3538668 | 5/1987 |
| DE | 69007107 | 1/1991 |
| EP | 0964138 | 12/1999 |
| JP | 63143360 | 6/1988 |
| JP | 2001127682 | 3/2001 |
| WO | WO-02/48528 | 6/2002 |
| WO | WO-02/090743 | 11/2002 |

* cited by examiner

*Primary Examiner*—Hieu T Vo
(74) *Attorney, Agent, or Firm*—Gifford, Krass, Sprinkle, Anderson & Citkowski, P.C.

(57) ABSTRACT

The invention relates to an internal combustion engine which can be operated with at least two fuels that have different knock resistance and which comprises at least one cylinder in which combustion of the fuel takes place cyclically. Said engine is provided with a dosing system for feeding a controlled quantity of fuel to the cylinder in every cycle. The dosing system is designed in such a manner that, when fuels are used that are less resistant to knocking, the quantity of air-fuel mixture supplied is maintained below a threshold quantity at which there is no danger of knocking.

15 Claims, 3 Drawing Sheets

INTERNAL COMBUSTION ENGINE FOR OPERATION WITH TWO DIFFERENT KNOCK RESISTANT FUELS

CROSS-REFERENCE TO RELATED APPLICATIONS

This application is a National Stage of International Application No. PCT/DE2004/000844, filed Apr. 23, 2004, and which claims priority to German Patent Application No. 103 18 963.7, filed Apr. 26, 2003. The disclosures of these applications are incorporated herein by reference.

FIELD OF THE INVENTION

The invention is concerned with an internal combustion engine for operation with at least two different knock resistant fuels of different knock resistances and having at least one cylinder in which the combustion of fuel takes place cyclically and a metering system for the supply of a controlled quantity of fuel to the cylinder in each cycle. An internal combustion engine of this type in accordance with the invention may be fed for example either with natural gas or gasoline as a fuel.

BACKGROUND OF THE INVENTION

So-called multi fuel engines are known that can operate with different types of fuel and are based on the Otto principle. In this kind of an engine an air-fuel mixture is compressed before an externally initiated ignition. The compression can also result in spontaneous ignition before the externally initiated ignition, which is something that is not desirable. In general, different fuels exhibit different knock resistances, i.e. their mixture with air can be compressed by different amounts before resulting in spontaneous ignition. In order to use the fuel ideally, it is preferable that the fuel be compressed as much as possible before the externally initiated ignition. The geometric compression of an engine is, however, an unalterable parameter that is usually determined by its design. This kind of an engine can thus only be ideally designed and set for one fuel with a specific knock resistance. Operating this engine with another fuel possessing lower knock resistance could result in knocking whereby the engine will sustain damage.

SUMMARY OF THE INVENTION

The object of the invention is to design an internal combustion engine that can be operated with two fuels with different knock resistances and thereby achieve a high degree of efficiency during operation with more knock resistant fuel as well as effectively avoiding knocking during operation with the fuel that is less knock resistant.

An internal combustion engine of this kind in accordance with the invention can be optimised in a manner know per se, in particular through its geometric compression ratio, for operation with the fuel considered to be more knock resistant. Knocking during operation with a fuel that is less knock resistant can be avoided in that the metering system is set to feed a smaller quantity of air-fuel mixture when using a fuel that is less knock resistant than when using a fuel that is more knock resistant, which corresponds to a reduction of the effective compression ratio for the fuel that is less knock resistant. The pressure of this smaller quantity in the cylinder is less than if a larger quantity of the more knock resistant mixture is supplied, so that critical state variables that could lead to spontaneous combustion of the fuel are not achieved even at the top dead centre of the cylinder.

One only expediently provides a reduction of the quantity of the less knock resistant mixture if this is actually required to suppress knocking, particularly in the high speed range of the engine. On the other hand, the quantities of the mixture supplied can be the same for both fuels in the case of low speeds.

The control of the supplied fuel quantities can be expediently realized in that the metering system has at least two metering instructions at its disposal and in each case selects the instruction used to meter the air-fuel mixture with respect to the fuel supplied.

The metering instruction preferably specifies the maximum quantity of air-fuel mixture to be supplied as a speed function of the speed of rotation of the combustion engine.

The internal combustion engine expediently has a valve arrangement with a plurality of change-over positions in each of which one of a plurality of inlets of the valve arrangement, which can each be respectively connected to a tank for different fuels, is connected to a supply line of the engine, whereby the metering instruction used by the metering system is linked to the change-over position of the valve arrangement. In the case of switching over from one knock resistant fuel to a less knock resistant fuel, this enables timely adaptation of the mixture quantities fed to the cylinder at the start of combustion of the less knock resistant fuel and thereby effectively protects the angina.

This kind of valve arrangement can be executed e.g. by a routing valve that optionally links one of the tanks with the supply line of the motor or by two blocking elements that are respectively located between one of the tanks and the supply line. The first alternative can be used particularly in the case of fuels that can be injected into the supply line through a common injector, i.e. particularly for two liquid fuels. The second alternative permits the use of two different injectors for the different fuels and is therefore preferred if fuels with different physical states are used.

In order to meter the mixture quantities supplied, the metering system expediently utilizes a restrictor with controllable cross section in the supply line. The restrictor is preferably located at a point in the supply line that is upstream from the injector or injectors, i.e. at a location where the supply line only supplies air. The quantity of air supplied can be reduced by reducing the cross section when using a fuel that is less knock resistant. The metering system regulates the quantity of fuel fed to the injector in accordance with this quantity of air so that a desired air-fuel ratio is maintained during combustion.

The restrictor is preferably a butterfly valve. Whereas its flow cross section is normally determined only by the control signal, that is e.g. created with the help of an accelerator pedal, the position of the butterfly valve in accordance with the invention depends not only on the control signal but also on the type of fuel used.

It is particularly preferred for the metering system to have a pre-compressor or charger in the supply line whose secondary pressure can be set lower when using the less knock resistant fuel than when using the more knock resistant fuel. This is preferably also located upstream from the injector or injectors in the supply line so that it only acts on the fresh air supplied to the motor and the quantity of fuel fed in at the injector is in each case regulated by the metering system in such a manner that the desired air-fuel ratio is maintained during combustion.

It is preferred that the internal combustion engine be designed for operation with a liquid fuel, particularly gasoline and with a gaseous fuel, particularly natural gas. The term "gaseous" does not, thereby, necessarily refer to the physical state in which the fuel is present in the vehicle's tank but to its physical state when mixed with air before combustion.

The valve arrangement in the case of this kind of an engine is preferably formed by a first stop valve that is located between the tank for the gaseous fuel and the fuel supply line of the engine and a pump disposed between the tank for the liquid fuel and the fuel supply line, which develops a blocking effect when in the switched off state and thus acts as a second stop valve.

It is of advantage for the combustion engine to have a compression ratio of at least 11.5 but preferably of approximately 12.5 to 13. This compression ratio is higher than the ratio of approximately 10.5 which is typical for a gasoline driven engine but well matched to the high knock resistance of natural gas.

If another fuel is chosen as being the most knock resistant, it is preferred that the quantity of the mixture supplied be smaller than the maximum mixture quantities that can be fed to the engine in order to avoid the mixture achieving state variables in the cylinder at which there is a danger of knocking.

It is advantageous that the process for combustion of gasoline in an engine be initiated with a compression ratio of at least 11.5 and preferably approximately 12.5 to 13.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

An exemplary embodiment of the invention which is to be particularly preferred is explained in more detail in the following with reference to the Figures, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
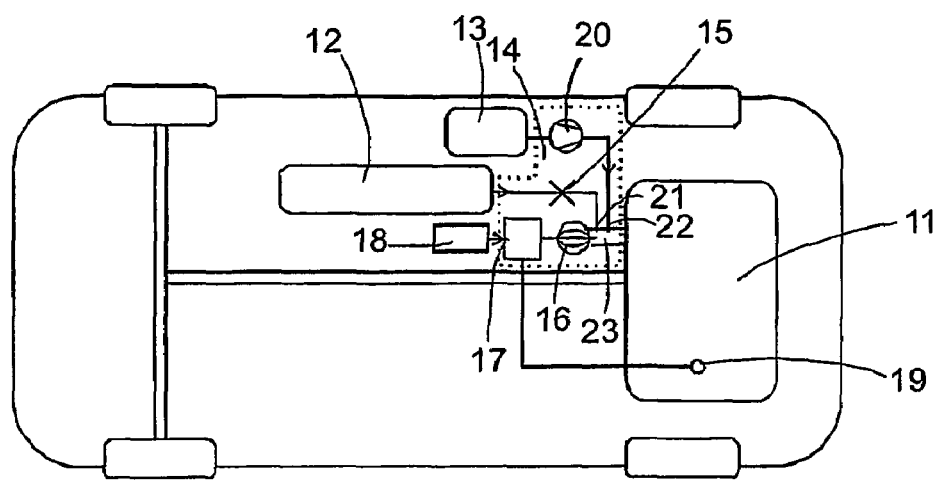
FIG. 1 is a schematic illustration of a vehicle with an internal combustion engine in accordance with the invention.

An example of an Otto engine for an internal combustion engine in accordance with the invention is described with reference to FIG. 1 that can be operated with both natural gas as well as with gasoline. The spark ignition engine in accordance with the invention has an engine block 11 that typically has four or six cylinders that are designed and constructed for operation principally with natural gas as fuel. Since the knock resistances of natural gas correspond to those of a fuel with up to RON 130 while normal gasoline has a value of RON 95, the spark ignition engine in accordance with the invention is executed with a compression of approximately 13:1 compared to a standard compression of 10.5:1 in a normal, gasoline-driven spark ignition engine. This greater compression is enabled by the higher knock resistance of natural gas when compared to gasoline and results in a higher degree of thermal efficiency in the spark ignition engine in accordance with the invention, which is around 5 to 7% more than the degree of thermal efficiency in a gasoline driven, normal spark ignition engine.

The engine block 11 is incorporated in a vehicle that has two fuel tanks 12, 13, a main tank 12 for natural gas and an auxiliary tank 13 for gasoline. The auxiliary tank 13 for gasoline is necessary since the number of gasoline filling stations at which natural gas can be tanked is still very small and it could be necessary to drive the vehicle temporarily with gasoline in order to be able to reach the next available natural gas fuelling station when the main tank 12 is empty.

The spark ignition engine in accordance with the invention is therefore driven with gasoline instead of with natural gas when in reserve operation. However, in the case of a high compression of approximately 13:1 for which the spark ignition engines in accordance with the invention are designed, gasoline would combust with knocking and result in damage to the engine if the engine were to be supplied with the same maximum quantity of air-fuel mixture in the case of gasoline operation, as is suitable for operation with natural gas at the same engine speed. In order to prevent this, a metering system 14 of the spark ignition engine in accordance with the invention—that normally serves to supply natural gas to the engine block 11 From the tank 12 and, when the latter is empty, fuel from tank 13—is designed to take account of this. The type of fuel supplied is taken into consideration when metering the mixture quantity fed to the engine in each combustion cycle.

The metering system 14 comprises a valve arrangement, a butterfly valve 16 and an electronic control circuit 17. The valve arrangement serves to permit entry of only one fuel at a time to a supply line 23 of the engine. It includes a stop valve 15 and a gasoline pump 20 that connect the main tank 12 and the auxiliary tank 13 to respective injectors 21 and 22 that are delegated to the supply line 23 of the engine. The butterfly valve 16 is also located in the supply line, upstream from the injectors 21, 22. The fuel pump 20 is of a type such that it blocks the line in which it is located when it is not in operation e.g. a piston pump. It is therefore, impossible for gasoline to enter the supply line 23 at the same time that the engine is being operated with natural gas or for a natural gas-air mixture to reach the auxiliary tank.

The electronic control circuit 17 receives, via the first signal input, a signal for desired performance that is, for example, dependent on the position of the accelerator pedal 18, via a second signal input, a signal from a speed sensor 19 located at a shaft of the engine 11 and, via a third signal input, a signal that indicates which engine fuel supply is currently in operation, i.e. whether the stop valve 15 is open or the fuel pump 20 is switched on. Depending on which engine fuel supply is in operation, the control circuit 17 uses one of two pre-determined metering instructions that are stored in an electronic memory of the control circuit, in order to regulate the position of the butterfly valve 16 and therewith the quantity of air-fuel mixture supplied to each cylinder. These metering instructions determine the quantity of mixture supplied in dependence on the performance required from the engine and/or on the position of the accelerator pedal 18 that is representative of this. At least the metering instructions used for the fuel that is less knock resistant further contains an upper limit for the quantity of mixture supplied that is not to be exceeded in order to avoid knocking in the engine 11, independent of the performance required at any one time. This upper limit is determined in dependence on the speed of the engine registered by the sensor 19. This upper limit can be determined in that the mechanical load is varied for a plurality of speeds in an engine prototype and the upper limit of mixture quantities supplied without resulting in knocking is tested. It has been found, particularly in the case of high speeds, that it is necessary to limit the maximum mixture quantity supplied for less knock resistant mixtures to a value that is less than that of the maximum quantity of the more knock resistant mixture supplied at the same speed, while the maximum quantities supplied at lower speeds could also possibly be set to be the same.

This kind of speed-dependent upper limit of mixture quantities supplied can naturally also be provided for knock resistant fuel, particularly in specific ranges of the speed of rotation.

The regulation of the mixture quantity that is controlled below this upper limit, in dependence on the engine load or on the performance demanded from it can in principle, take place in the customary manner whereby however, the dependence of the mixture quantity supplied on the performance required at a given speed of rotation could be different for both fuels.

A compressor or a charger can also be located in the supply line 23 in the place of the butterfly valve 16, which injects fresh air under adjustable high pressure into the supply line. In this case the effective compression of the air-fuel mixture in the cylinder comprises the compression by the charger and the geometric compression in the cylinder. Analogously, as described above for the butterfly valve, by operating the charger with different compression depending on the fuel used, the quantity of mixture supplied to the cylinder when using the less knock resistant fuel can be reduced.

Figure 2:
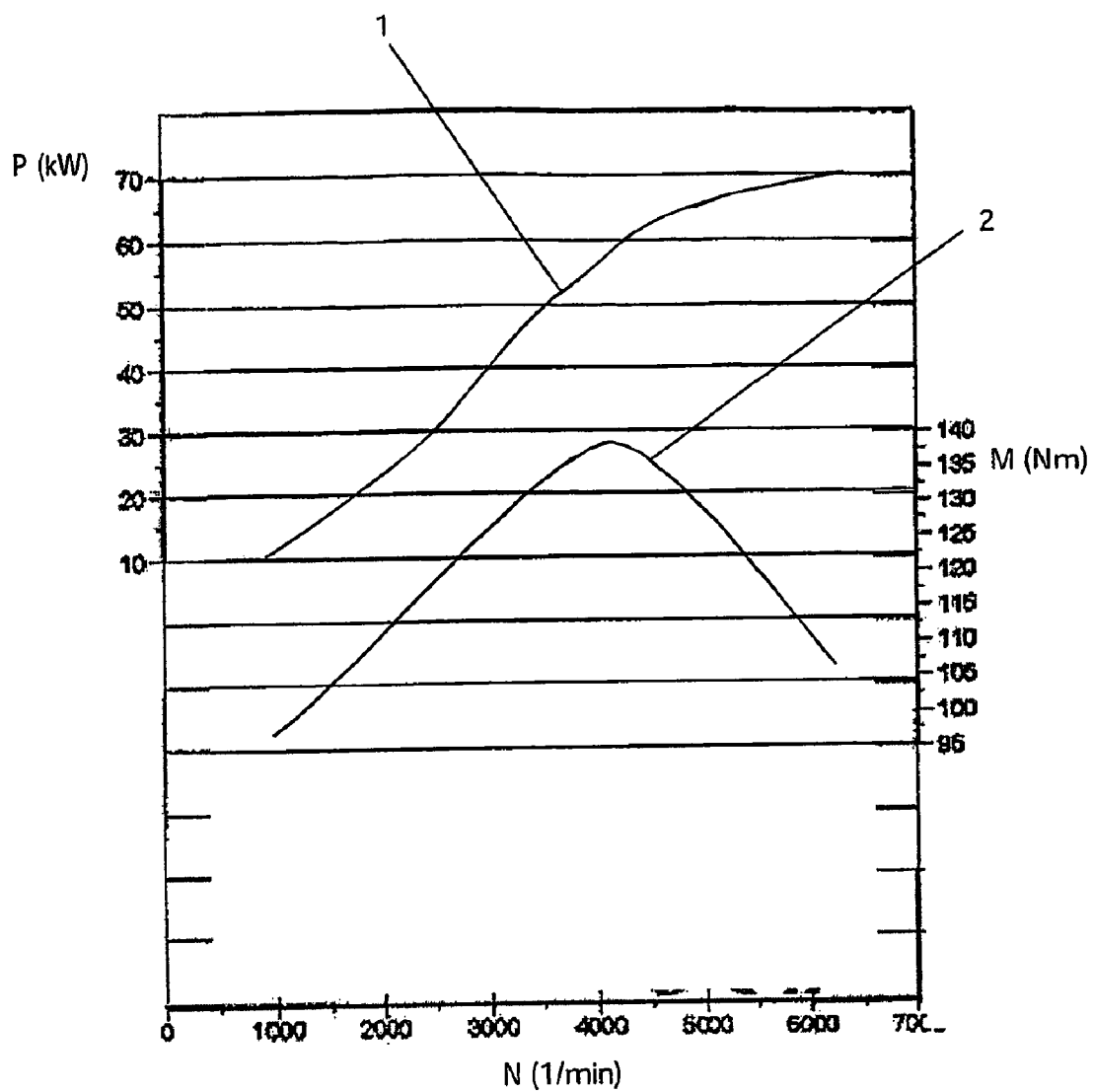
FIG. 2 illustrates engine characteristics of the combustion engine in accordance with the invention when driven by natural gas.

In FIG. 2 different engine characteristics for the spark ignition engine in accordance with the invention are displayed that have been determined on an engine test stand during which the spark ignition engine was driven by natural gas. All characteristics are plotted in dependence on the engine speed that is entered along the X axis in revolutions per minute. Characteristic 1 shows the engine performance found. This begins at 10 kW with an engine speed of 1000 rpm and increases to 70 kW at an engine speed of just over 6000 rpm. The build-up thereby takes place increasing monotonically with a slight kink at around 4000 rpm and 60 kW.

Characteristic 2 represents the torque M generated by the engine. It starts at approximately 98 Nm at 1000 rpm and increases to just over approximately 137 Nm at 4000 rpm to in order to fall again at beyond 4000 rpm.

Figure 3:
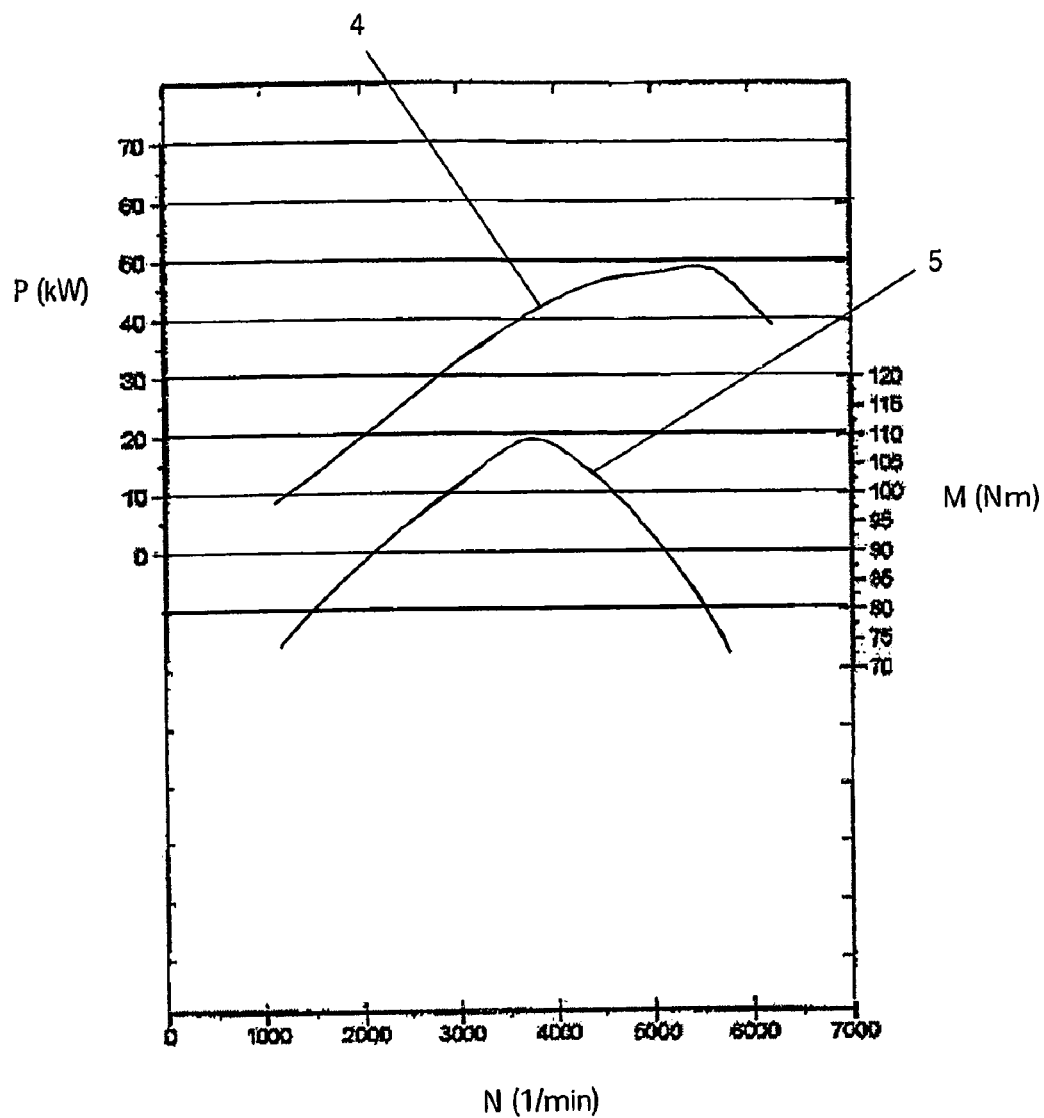
FIG. 3 illustrates engine characteristics of the combustion engine in accordance with the invention when driven by gasoline.

FIG. 3 displays corresponding characteristics for the same engine when driven by gasoline as the fuel. At first glance the characteristics in FIG. 3 appear to be less uniform when compared to those in FIG. 2. Thus, for example, the characteristic 4 for engine power P in the range of 1000 rpm up to 4000 rpm increases strictly monotonically from 10 kW to approximately 47 kW and exhibits alternatively falling and increasing trends at speeds of more than 4000 rpm. The characteristic 4 achieves its maximum at just over 5000 rpm with 52 kW in the speed range illustrated. This maximum lies clearly below the maximum of 70 kW of characteristic 1.

The characteristic 5 behaves in a similar manner for the torque M of the engine. This increases strictly in the range from 1000 rpm up to 4000 rpm from 75 Nm to 113 Nm. However, it falls more steeply at over 4000 rpm when compared to characteristic 2, then increases slightly between 4500 rpm and 5500 rpm and subsequently falls abruptly.

A direct comparison of the performance characteristics 1 and 4 shows that performance achieved with gasoline as the fuel for speeds N up to 4000 rpm is slightly less than that achieved with natural gas. The difference between characteristics 1 and 4 increases with increasing speed N. The difference in curves 1 and 4 becomes markedly noticeable for speeds N above 4000 rpm. i.e. markedly reduced performances are achieved with gasoline operation of the engine at these speeds.

The reduced engine performance P and the smaller torque M of the engine are, however, generally secondary and acceptable since operation of the engine with gasoline takes place only in reserve operation or in emergency operation. The restriction of the mixture quantity that results in lowered performance reliably reduces knocking as well as damage during operation with a less knock resistant fuel.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An internal combustion engine for operation with at least two fuels of different knock resistances, comprising:
   at least one cylinder in which the combustion of fuel takes place cyclically; and
   a metering system (14) to supply to the cylinder in each cycle a quantity of air-fuel mixture regulated by way of a control signal, wherein the metering system (14) is designed to supply a first quantity of air-fuel mixture at a specific value of the control signal when using a fuel that is less knock resistant, this first quantity being smaller than a second quantity that is supplied at the same value of the control signal when using the more knock resistant fuel.

2. The internal combustion engine according to claim 1, wherein the metering system is designed to supply the smaller quantity of the less knock resistant mixture only under defined operating conditions of the engine and otherwise to supply either the more knock resistant mixture or the less knock resistant fuel in the same amount in each case.

3. The internal combustion engine according to claim 2, wherein the defined operating conditions correspond to a high speed range of the engine.

4. The internal combustion engine according claim 1, wherein the metering system has at least two metering instructions and selects the instruction used to meter the air-fuel mixture on the basis of the respectively supplied fuel.

5. The internal combustion engine according to claim 4, wherein every metering instruction specifies a maximum quantity of the air-fuel mixture to be supplied as a function of the speed of rotation of the internal combustion engine.

6. The internal combustion engine according to claim 1, wherein a valve arrangement (15, 20) with a plurality of inlets and a plurality of switching states in which a respective one of the inlets of the valve arrangement (15, 20) is connected to a supply line (23) of the engine (11), wherein a metering instruction used by the metering system (14) is coupled to the switching state of the valve arrangement (15, 20).

7. The internal combustion engine according to claim 6, wherein the valve arrangement comprises a plurality of blocking elements (15, 20) that are located between the inlets and the supply line (23).

8. The internal combustion engine according to claim 7, wherein one of the blocking elements is a stop valve (15) and one is a pump (20).

9. The internal combustion engine according to claim 6, wherein the metering system (14) comprises a restriction (16) with a controllable cross section in the supply line.

10. The internal combustion engine according to claim 9, wherein the restriction (16) is a butterfly valve.

11. The internal combustion engine according to claim 6, wherein the metering system (14) comprises a charger in the supply line.

12. The internal combustion engine according to claim 1, wherein the engine is designed for use with gasoline and with natural gas.

13. The internal combustion engine according to claim 1, wherein the engine has a compression ratio of at least 11.5 but preferably of approximately 12.5 to 13.

14. A process for operation of an internal combustion engine, comprising:

selecting one fuel from at least two fuels possessing different knock resistances;

cyclically supplying a cylinder of the engine with regulated quantities of a mixture of air and fuel in dependence on a control signal; and combusting the air and fuel mixture within the cylinder;

wherein the supplied quantity is further regulated in dependence on the type of fuel supplied in the mixture, with the quantity supplied for a fuel with lower knock resistance, at least under defined operating conditions, being smaller than for a fuel with higher knock resistance at the same value of the control signal.

15. The process according to claim 14, wherein the process can be set optionally for the combustion of gasoline or natural gas in an engine with a compression ratio of at least 11.5, preferably approximately 12.5 to 13.

* * * * *